United States Patent
Kawasaki

(10) Patent No.: US 8,355,668 B2
(45) Date of Patent: Jan. 15, 2013

(54) RELAY STATION, RELAY METHOD, RECEIVING STATION AND RECEIVING METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 12/730,491

(22) Filed: Mar. 24, 2010

(65) Prior Publication Data

US 2010/0248614 A1 Sep. 30, 2010

(30) Foreign Application Priority Data

Mar. 27, 2009 (JP) .................................. 2009-080130

(51) Int. Cl.
*H04J 3/06* (2006.01)
*H04W 4/00* (2009.01)
*H04B 3/36* (2006.01)
*H04B 7/15* (2006.01)
*H04B 1/60* (2006.01)

(52) U.S. Cl. ............... 455/7; 455/11.1; 455/431; 455/9; 370/350; 370/328; 375/343; 375/365; 375/347

(58) Field of Classification Search ............ 455/7, 11.1, 455/431, 9; 370/328, 350; 375/343, 347, 375/365

See application file for complete search history.

(56) References Cited

U.S. PATENT DOCUMENTS

| | | | | |
|---|---|---|---|---|
| 7,941,148 B2 * | 5/2011 | Roskowski et al. | ........... | 455/436 |
| 8,045,917 B2 * | 10/2011 | Beck et al. | ......................... | 455/7 |
| 2003/0081703 A1 * | 5/2003 | Kawaguchi et al. | .......... | 375/343 |
| 2005/0020203 A1 * | 1/2005 | Losh et al. | .................... | 455/11.1 |
| 2006/0007904 A1 * | 1/2006 | Shimomura et al. | .......... | 370/342 |
| 2007/0183518 A1 * | 8/2007 | Ma et al. | ........................ | 375/260 |
| 2009/0225743 A1 * | 9/2009 | Nicholls et al. | ................ | 370/350 |
| 2009/0316812 A1 * | 12/2009 | Sahara | ............................ | 375/260 |
| 2010/0142609 A1 * | 6/2010 | Ban et al. | ....................... | 375/232 |
| 2011/0090104 A1 * | 4/2011 | Sata et al. | ....................... | 341/116 |

FOREIGN PATENT DOCUMENTS

JP 2006-512874 4/2006

* cited by examiner

*Primary Examiner* — Bobbak Safaipour
(74) *Attorney, Agent, or Firm* — Katten Muchin Rosenman LLP

(57) ABSTRACT

A relay station includes a receiver that receives a signal from a base transceiver station, a detection unit that detects a carrier frequency deviation of the received signal, and a calculation unit that calculates a delay rate of the signal based on the detected carrier frequency deviation. The relay station includes a delay control unit that controls an amount of delay of the signal in accordance with the calculated delay rate, a compensation unit that compensates for the detected carrier frequency deviation of the signal, and a transmitter that transmits the signal of which the amount of delay is controlled and of which the carrier frequency deviation is compensated for.

12 Claims, 16 Drawing Sheets

RELAY STATION, RELAY METHOD, RECEIVING STATION AND RECEIVING METHOD

CROSS-REFERENCE TO RELATED APPLICATIONS

This application is based upon and claims the benefit of priority of the prior Japanese Patent Application No. 2009-80130, filed on Mar. 27, 2009, the entire contents of which are incorporated herein by reference.

FIELD

The present invention relates to a relay station, a relay method, a receiving station and a receiving method which compensate frequency deviation caused by Doppler effect.

BACKGROUND

In recent years, a cellular mobile radio communication system has become popular and many users have performed communication on a moving object such as a train. In order to perform a high-capacity communication in the mobile communication system, high carrier frequency is used for broadening the range of frequencies and a modulation system such as a multilevel quadrature amplitude modulation (QAM) system is employed. Transportation system has developed and the train has increased its speed.

In such a mobile communication system, when the train provided with a mobile station moves at a high speed, received frequency deviation is increased by Doppler effect. Doppler frequency deviation is increased when the train moves at a higher speed or uses higher carrier frequency. To automatically control carrier frequency, an automatic frequency control (AFC) may be used (refer to Japanese National Publication of International Patent Application No. 2006-512874, for example).

Even if the carrier frequency deviation caused by Doppler effect is compensated in the above-described conventional art, however, symbol (chip or sample) frequency deviation may not be compensated, so that the symbol frequency deviation is increased and communication quality such as code error rate deteriorates, accordingly. In a communication system such as Wideband Code Division Multiple Access (W-CDMA), where the carrier frequency and the symbol frequency are desired to be synchronized, compensating the carrier frequency deviation is not enough to obtain communication quality.

SUMMARY

According to an aspect of the invention, a relay station includes a receiver that receives a signal from a base transceiver station, a detection unit that detects a carrier frequency deviation of the received signal, and a calculation unit that calculates a delay rate of the signal based on the detected carrier frequency deviation. The relay station includes a delay control unit that controls an amount of delay of the signal in accordance with the calculated delay rate, a compensation unit that compensates for the detected carrier frequency deviation of the signal, and a transmitter that transmits the signal of which the amount of delay is controlled and of which the carrier frequency deviation is compensated for.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following will describe the preferred embodiments of the relay station, the relay method, the receiving station and the receiving method in detail with reference to the accompanying drawings.

(First Embodiment)

Figure 1:
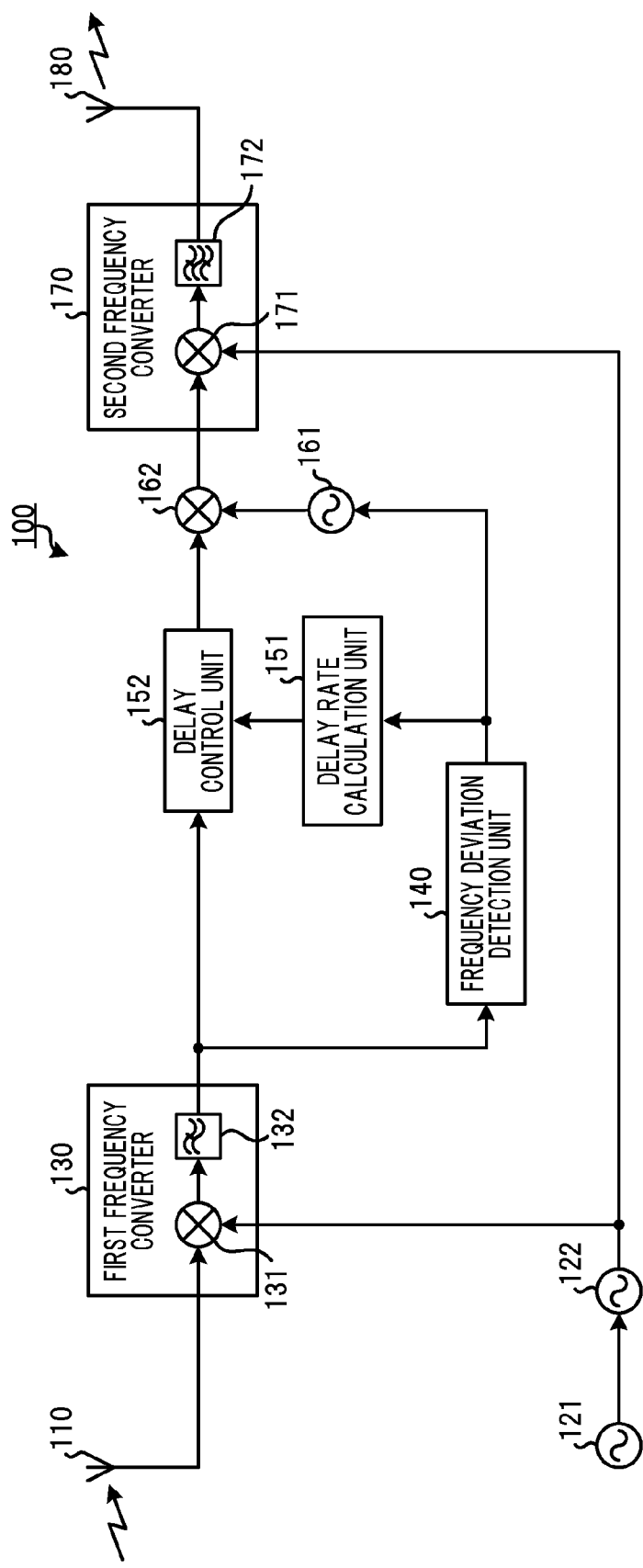
FIG. 1 is a block diagram illustrating the configuration of a relay station according to a first embodiment.

FIG. 1 is a block diagram illustrating the configuration of the relay station according to the first embodiment. The relay station according to the first embodiment is, for example, a radio relay station which is provided in a moving object such as a train for relaying communication between a mobile station in the moving object and a base transceiver station outside of the moving object. The communication system including a base transceiver station, a relay station and a mobile station will be described later (refer to FIG. 15). Referring to FIG. 1, the following will describe the configuration of the relay station for the downlink which transmits a signal from the base transceiver station to the mobile station.

As illustrated in FIG. 1, the relay station 100 includes a base transceiver station-side antenna 110, a reference oscillator 121, a local oscillator 122, a first frequency converter 130, a frequency deviation detection unit 140, a delay rate calculation unit 151, a delay control unit 152, a compensation oscillator 161, a complex multiplier 162, a second frequency converter 170 and a mobile station-side antenna 180.

The base transceiver station-side antenna 110 receives the radio frequency (RF) signal transmitted from the base transceiver station. The base transceiver station-side antenna 110 transmits the received RF signal to the first frequency converter 130. Carrier frequency of the signal which the base transceiver station-side antenna 110 receives is designated as fc. The reference oscillator 121 oscillates a reference signal and transmits it to the local oscillator 122. The local oscillator 122 oscillates a local signal from which frequency fc is synchronized with the frequency of the reference signal transmitted from the reference oscillator 121, and transmits the oscillated local signal to each of the first frequency converter 130 and the second frequency converter 170.

The first frequency converter 130 converts the carrier frequency of the RF signal, which is transmitted from the base transceiver station-side antenna 110, to baseband frequency (quadrature detection). The first frequency converter 130 includes a first mixer 131 and a low-pass filter 132. The first mixer 131 multiplies the RF signal, which is transmitted from the base transceiver station-side antenna 110, and the local signal, which is transmitted from the local oscillator 122. The first mixer 131 transmits to the low-pass filter 132 the signal indicative of the result of multiplication.

The low-pass filter 132 extracts the frequency component of the signal transmitted from the first mixer 131, which is the difference obtained by the multiplication. The signal extracted by the low-pass filter 132 is a baseband signal of the RF signal, which is transmitted to the first frequency converter 130. The low-pass filter 132 transmits the extracted baseband signal to each of the frequency deviation detection unit 140 and the delay control unit 152.

Figure 2:
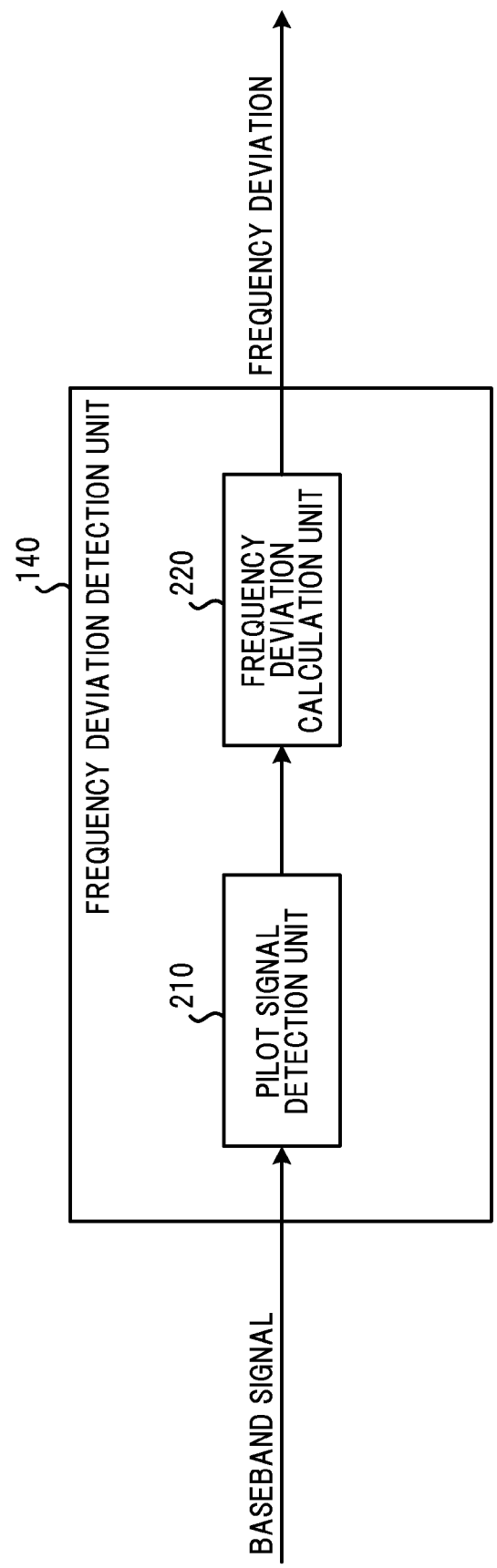
FIG. 2 is a block diagram illustrating an example of the configuration of the frequency deviation detection unit of FIG. 1.

The frequency deviation detection unit 140 detects the frequency deviation of the signal, which is received by the base transceiver station-side antenna 110, based on the baseband signal transmitted from the first frequency converter 130 (in detail, refer to FIG. 2, for example). The frequency deviation detection unit 140 notifies each of the delay rate calculation unit 151 and the compensation oscillator 161 of the detected frequency deviation.

The delay rate calculation unit 151 calculates the delay time rate based on the frequency deviation notified by the frequency deviation detection unit 140. The delay time rate is delay time per unit time caused by Doppler effect. Frequency deviation fd which is notified by the frequency deviation detection unit 140 is represented by the following expression (1), for example.

$$fd = \frac{v}{\lambda} = \frac{\frac{ds}{dt}}{\frac{c}{fc}} = \frac{d\tau}{dt} \cdot fc \quad (1)$$

In the above expression (1), the reference sign v represents the relative velocity of the moving object, which is provided with the relay station 100, to the base transceiver station, and the reference sign λ represents the wavelength of the signal which the relay station 100 receives from the base transceiver station. The reference sign s represents the distance between the base transceiver station and the relay station 100, the reference sign t represents time and the reference sign c represents the velocity of light ($3 \times 10^8$ [m/s]). The reference sign τ represents delay time caused by Doppler effect. From the above expression (1), the delay time rate dτ/dt is represented by the following expression (2).

$$\frac{d\tau}{dt} = \frac{fd}{fc} \quad (2)$$

The delay rate calculation unit 151 calculates the delay time rate dτ/dt by using, for example, the above expression (2) and the frequency deviation fd, which is notified by the frequency deviation detection unit 140. The delay rate calculation unit 151 notifies the delay control unit 152 of the calculated delay time rate. For example, when the carrier frequency fc equals 3 GHz and moving velocity v equals 360 km/h or 100 m/s, the frequency deviation fd equals 1 kHz based on the above expression (1). In this case, the delay time rate dτ/dt equals $0.33 \times 10^{-6}$ based on the above expression (2).

The delay control unit 152 controls amount of delay of the baseband signal, which is transmitted from the first frequency converter 130, in accordance with the delay time rate dτ/dt, which is notified by the delay rate calculation unit 151. For example, when the delay time rate dτ/dt equals $0.33 \times 10^{-6}$, the delay control unit 152 varies 0.33 μs of the amount of delay of the baseband signal per second, which may compensate symbol frequency deviation caused by Doppler effect. The delay control unit 152 transmits the baseband signal, of which amount of delay is controlled, to the complex multiplier 162.

In order that the delay control unit 152 may control both an increase and a decrease of amount of delay of the baseband signal, the baseband signal is preferably kept delayed for a specified amount at an initial condition where Doppler effect does not occur. The compensation oscillator 161 and the complex multiplier 162 are a compensation unit which compensates the carrier frequency deviation of the baseband signal based on the carrier frequency deviation which is detected by the frequency deviation detection unit 140.

The compensation oscillator 161 oscillates carrier compensation signal in accordance with the frequency deviation notified by the frequency deviation detection unit 140, and transmits the oscillated carrier compensation signal to the complex multiplier 162. The complex multiplier 162 complex multiplies the baseband signal, which is transmitted from the delay control unit 152, by the carrier compensation signal, which is transmitted from the compensation oscillator 161, and transmits such multiplied baseband signal to the second frequency converter 170.

The second frequency converter 170 converts the baseband frequency of the baseband signal, which is transmitted from the complex multiplier 162, to the carrier frequency (RF frequency) (quadrature modulation). The second frequency converter 170 includes a second mixer 171 and a band-pass filter 172. The second mixer 171 multiplies the baseband signal, which is transmitted from the complex multiplier 162, and the local signal, which is transmitted from the local oscillator 122. The second mixer 171 transmits to the band-pass filter 172 the signal indicative of the result of multiplication.

The band-pass filter 172 extracts the frequency component of the modulated signal of the signal transmitted from the second mixer 171. The signal extracted by the band-pass filter 172 is an RF signal, which the frequency of the baseband signal transmitted to the second frequency converter 170 is converted to. The band-pass filter 172 transmits the extracted RF signal to the mobile station-side antenna 180. The mobile station-side antenna 180 transmits the RF signal, which is transmitted from the second frequency converter 170, to the mobile station.

In the above-described first embodiment, after the received RF signal is converted to the baseband signal, the carrier frequency deviation and the symbol frequency deviation of the baseband signal are compensated. The compensated baseband signal is converted to the RF signal and then transmitted. However, the present invention is not limited to such first embodiment. For example, after the received RF signal is converted to an intermediate frequency (IF) signal, the carrier frequency deviation and the symbol frequency deviation of the IF signal may be compensated. In this case, the compensated IF signal is converted to the RF signal and then transmitted.

For example, the difference between the frequency f1 of the local oscillator 122, which is synchronized with the reference signal oscillated from the reference oscillator 121, and the frequency fc of the RF signal will be referred to as frequency of the IF signal. Instead of the low-pass filter 132, a band-pass filter is provided for extracting the frequency component of the signal transmitted from the first mixer 131, which is the difference obtained by the multiplication. Thus, after the frequency of the RF signal is converted to the frequency of the IF signal, the carrier frequency deviation and the symbol frequency deviation of the IF are compensated. The compensated IF signal is converted to the RF signal.

FIG. 2 is a block diagram illustrating an example of the configuration of the frequency deviation detection unit of FIG. 1. As illustrated in FIG. 2, the frequency deviation detection unit 140 (refer to FIG. 1) includes a pilot signal detection unit 210 and a frequency deviation calculation unit 220. The pilot signal detection unit 210 detects the pilot signal which is included in the baseband signal transmitted from the first frequency converter 130.

The pilot signal detection unit 210 transmits the detected pilot signal to the frequency deviation calculation unit 220. The frequency deviation calculation unit 220 finds the phase rotation of the pilot signal which is transmitted from the pilot signal detection unit 210, thereby calculating frequency deviation. The frequency deviation calculation unit 220 notifies each of the delay rate calculation unit 151 and the compensation oscillator 161 of the calculated frequency deviation.

Figure 3:
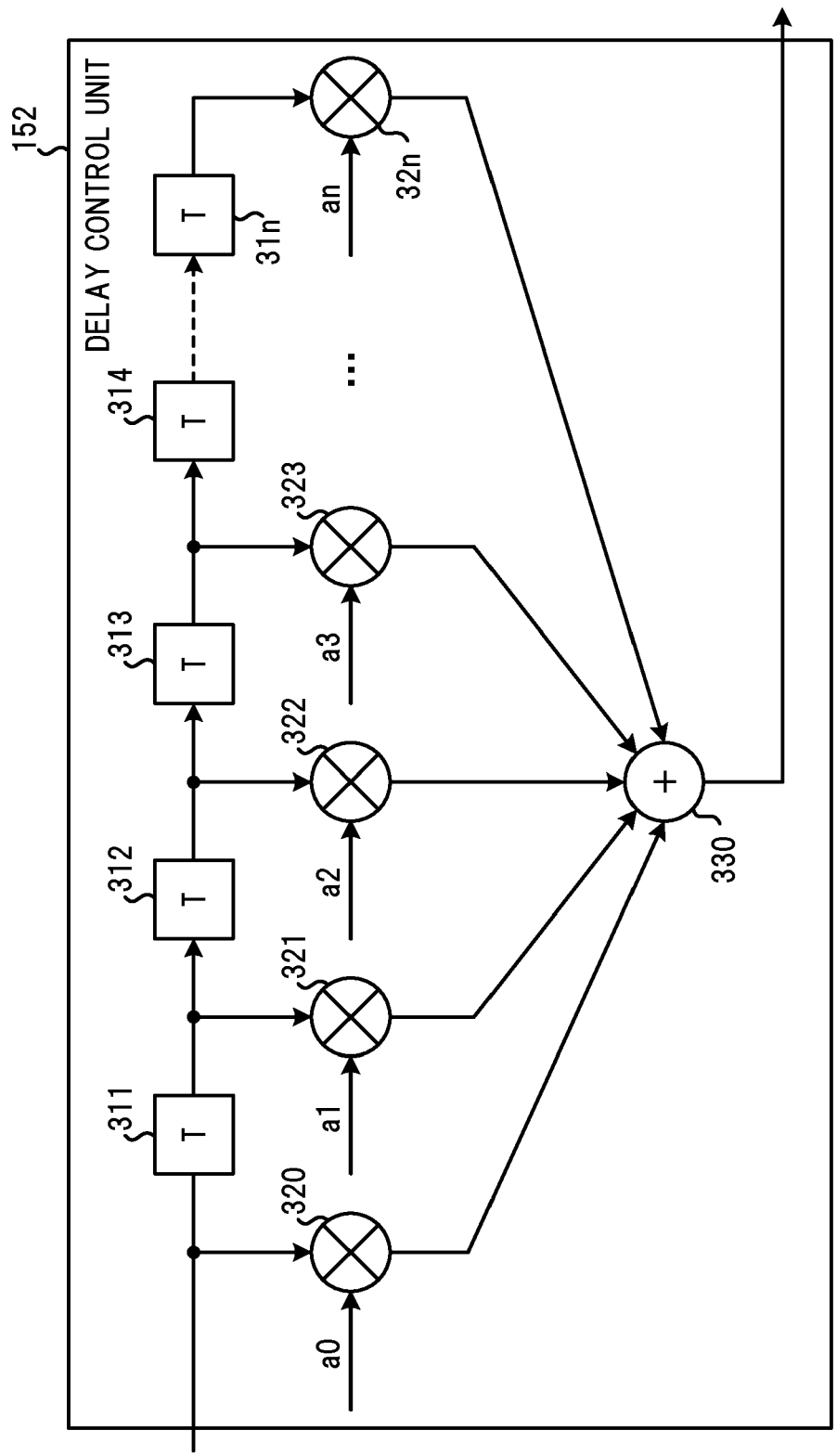
FIG. 3 is a block diagram illustrating an example of the configuration of the delay control unit of FIG. 1.

FIG. 3 is a block diagram illustrating an example of the configuration of the delay control unit of FIG. 1. As illustrated in FIG. 3, the delay control unit 152 is a time varying rate filter which includes delay circuits 311 to 31n, multipliers 320 to 32n, an adder 330 and a tap coefficient control circuit (not illustrated) where n is natural number and equal to five or more. The delay circuits 311 to 31n, the multipliers 320 to 32n and the adder 330 form a FIR (Finite Impulse Response) filter or a transversal filter.

The tap coefficient control circuit (not illustrated) of the delay control unit 152 transmits tap coefficients a0 to an to the multipliers 320 to 32n, respectively. The baseband signal, which is transmitted to the delay control unit 152, is received by each of the multiplier 320 and the delay circuit 311. The multiplier 320 multiplies the received baseband signal by the tap coefficient a0 and transmits the multiplied baseband signal to the adder 330.

The delay circuit 311 delays the received baseband signal and transmits the delayed baseband signal to each of the multiplier 321 and the delay circuit 312. The multiplier 321 multiplies the baseband signal, which is transmitted from the delay circuit 311, by the tap coefficient a1 and transmits the multiplied baseband signal to the adder 330.

The delay circuit 312 delays the baseband signal, which is transmitted from the delay circuit 311, and transmits the delayed baseband signal to each of the multiplier 322 and the delay circuit 313. The multiplier 322 multiplies the baseband signal, which is transmitted from the delay circuit 312, by the tap coefficient a2 and transmits the multiplied baseband signal to the adder 330.

The delay circuit 313 delays the baseband signal, which is transmitted from the delay circuit 312, and transmits the delayed baseband signal to each of the multiplier 323 and the delay circuit 314. The multiplier 323 multiplies the baseband signal, which is transmitted from the delay circuit 313, by the tap coefficient a3 and transmits the multiplied baseband signal to the adder 330.

The delay circuit 31n delays the baseband signal, which is transmitted from the delay circuit 31(n−1), and transmits the delayed baseband signal to the multiplier 32n. The multiplier 32n multiplies the baseband signal, which is transmitted from the delay circuit 31n, by the tap coefficient an and transmits the multiplied baseband signal to the adder 330.

The adder 330 adds the baseband signals together, which are transmitted from the multipliers 320 to 32n, respectively, and transmits the added baseband signal to the complex multiplier 162. The tap coefficient control circuit (not illustrated) of the delay control unit 152 adjusts the tap coefficients a0 to an, which are transmitted to the multipliers 320 to 32n, respectively, based on the delay rate which is notified by the delay rate calculation unit 151, thereby varying the amount of delay of the baseband signal.

Figure 4:
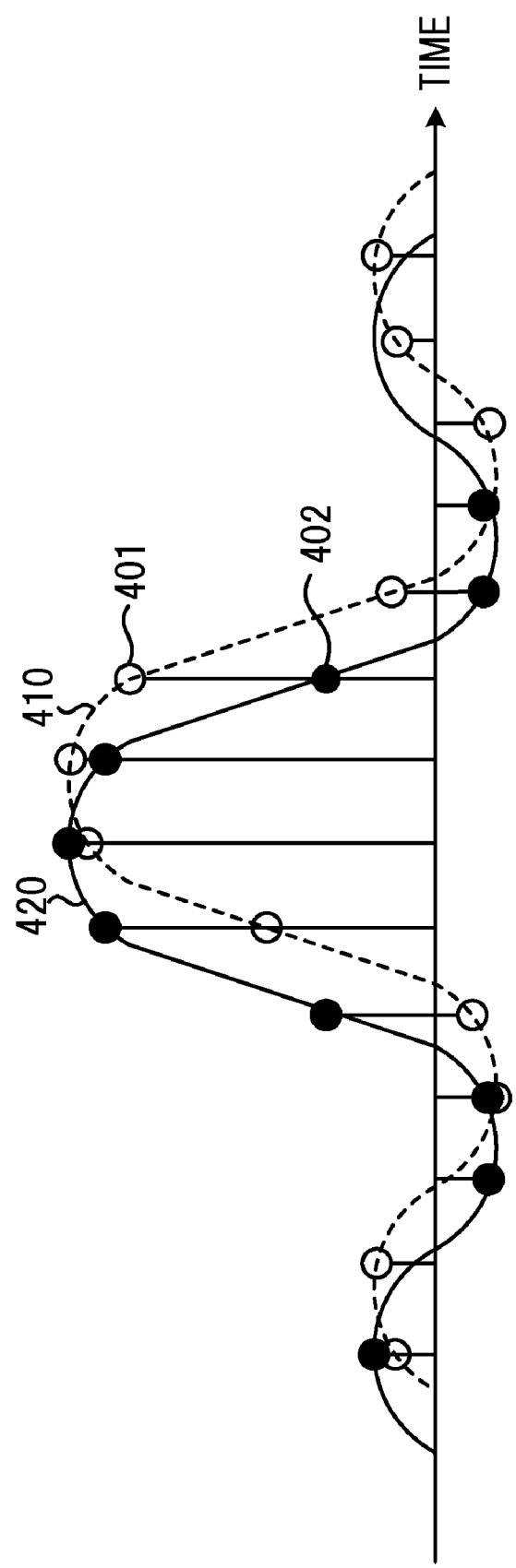
FIG. 4 is a diagram illustrating an example of the operation of the delay control unit of FIG. 3.

FIG. 4 is a diagram illustrating an example of the operation of the delay control unit of FIG. 3. Referring to FIG. 4, the waveform 410 represents the baseband signal in the case of large amount of delay. The plot points of the waveform 410 vary in accordance with the tap coefficients a0 to an of the delay control unit 152 of FIG. 3, which are received by the multipliers 320 to 32n, respectively.

For example, the tap coefficient control circuit of the delay control unit 152 adjusts one of the tap coefficients a0 to an which corresponds to the plot point 401 to be a plot point 402. Similarly, when the tap coefficients which correspond to the other plot points of the waveform 410 are adjusted, the baseband signal is varied from the waveform 410 to the waveform 420. Thus, the baseband signal is advanced.

According to the relay station 100 of the first embodiment, the carrier frequency deviation caused by Doppler effect is compensated while the symbol frequency deviation is compensated by controlling the amount of delay of the signal. Thus, communication quality is improved. For example, when the symbol frequency deviation is compensated in a wideband communication system, communication quality is improved.

It is possible to synchronize the carrier frequency and the symbol frequency by compensating both the carrier frequency deviation and the symbol frequency deviation. Therefore, in the communication system such as W-CDMA, which desires to synchronize the carrier frequency and the symbol frequency, communication system is improved.

If the mobile station, which does not support high-speed movement, is located in the moving object such as vehicle, the mobile station may communicate with the base transceiver station outside of the moving object in high quality by the relay of the relay station 100. For example, the mobile station may communicate with the base transceiver station via the relay station 100 in high quality by wireless LAN (Local Area Network) communication between the relay station 100 and the mobile station.

When the received RF signal is converted to the baseband signal, the detection of the carrier frequency deviation and control of the amount of delay of the signal are performed stably and accurately. When the received RF signal is converted to the IF signal, the detection of the carrier frequency deviation and control of the amount of delay of the signal are also performed stably and accurately.

(Second Embodiment)

Figure 5:
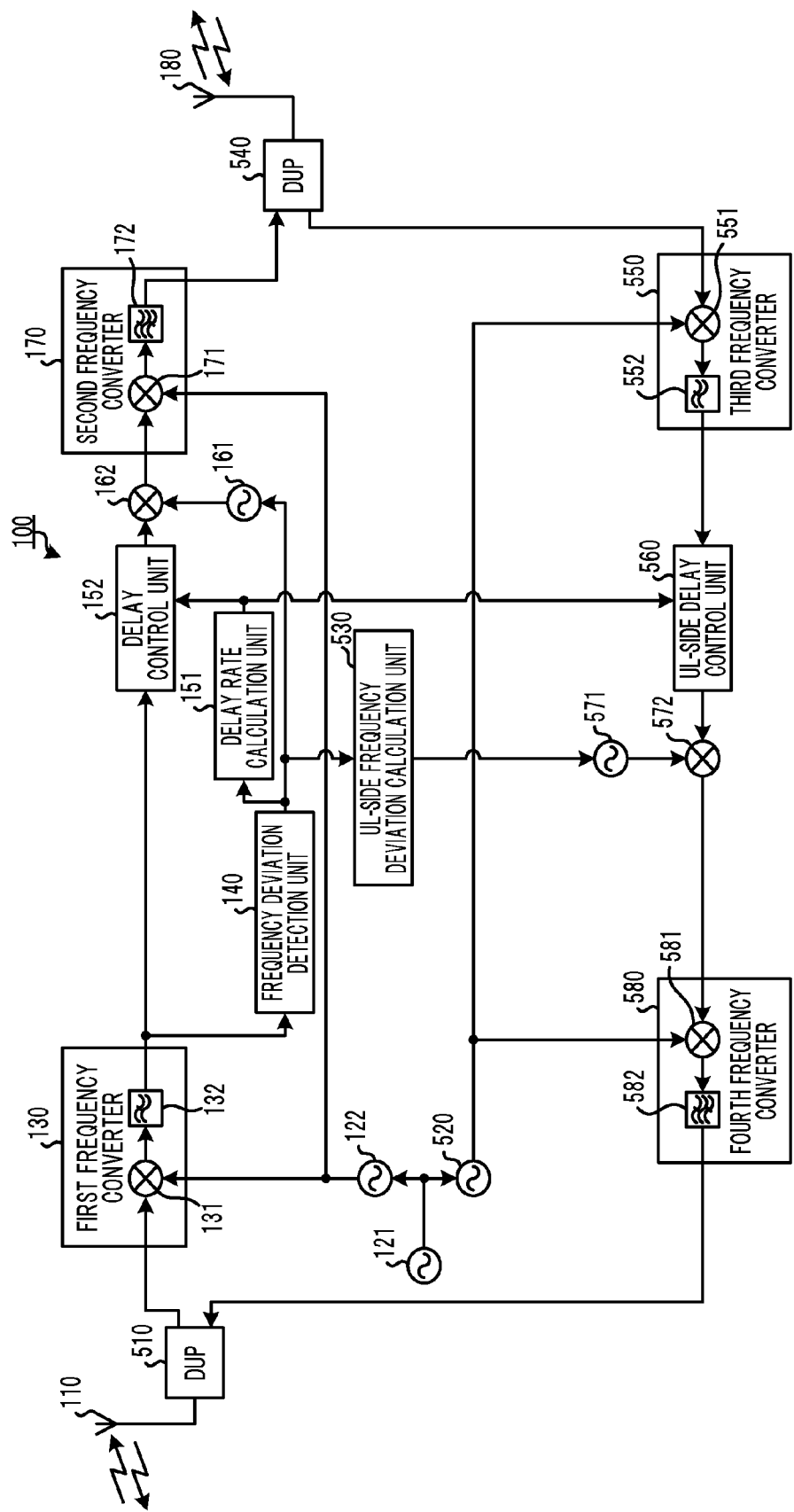
FIG. 5 is a block diagram illustrating the configuration of a relay station according to a second embodiment.

FIG. 5 is a block diagram illustrating the configuration of the relay station according to the second embodiment. Referring to FIG. 5, like reference numerals of FIG. 1 are applied to like elements and the description thereof is omitted. The relay station 100 of the second embodiment performs two-way communication caused by Frequency Domain Duplex (FDD).

The relay station 100 includes a first DUP (Duplexer) 510, a UL-side local oscillator 520, a UL-side frequency deviation calculation unit 530, a second DUP 540, a third frequency converter 550, a UL-side delay control unit 560, a UL-side compensation oscillator 571, a UL-side complex multiplier 572 and a fourth frequency converter 580 in addition to the configuration of FIG. 1.

In the FDD, the signal of the downlink (DL), which receives from the base transceiver station, and the signal (second signal) of the uplink (UL), which receives from the mobile station, are different in carrier frequency, so that the downlink and the uplink are also different in carrier frequency deviation. Therefore, when the frequency deviation of the downlink is calculated, the frequency deviation of the uplink is estimated.

The base transceiver station-side antenna 110 receives the RF signal, which is transmitted from the base transceiver station, and transmits the received RF signal to the first DUP 510 while transmitting the RF signal, which is transmitted from the first DUP 510, to the base transceiver station (second transmitter). The first DUP 510 transmits the RF signal, which is transmitted from the base transceiver station-side antenna 110, to the first frequency converter 130 while transmitting the RF signal, which is transmitted from the fourth frequency converter 580, to the base transceiver station-side antenna 110.

The reference oscillator 121 transmits the oscillated reference signal to each of the local oscillator 122 and the UL-side local oscillator 520. The UL-side local oscillator 520 oscillates the local signal, which is synchronized with the reference signal transmitted from the reference oscillator 121, and transmits the oscillated local signal to each of the third frequency converter 550 and the fourth frequency converter 580. The first frequency converter 130 converts the frequency of the RF signal transmitted from the first DUP 510. The frequency deviation detection unit 140 notifies of the detected frequency deviation each of the delay rate calculation unit 151, the compensation oscillator 161 and the UL-side frequency deviation calculation unit 530.

The UL-side frequency deviation calculation unit 530 calculates frequency deviation in the uplink based on the frequency deviation which is notified by the frequency deviation detection unit 140. The UL-side frequency deviation calculation unit 530 notifies the UL-side compensation oscillator 571 of the calculated frequency deviation. Since the frequency deviation (Doppler frequency) is proportional to the carrier frequency, the UL-side frequency deviation calculation unit 530 calculates frequency deviation fd_UL in the uplink by the following expression (3).

$$fd\_UL = \frac{fc\_UL}{fc\_DL} \cdot fd\_DL \qquad (3)$$

In the above expression (3), fc_DL represents carrier frequency (fc in the first embodiment) in the downlink. fc_UL represents carrier frequency in the uplink. The delay rate calculation unit 151 notifies of the calculated delay time rate each of the delay control unit 152 and the UL-side delay control unit 560.

The second frequency converter 170 transmits the baseband signal, of which frequency is converted (quadrature modulation), to the second DUP 540. The second DUP 540 transmits the RF signal, which is transmitted from the second frequency converter 170, to the mobile station-side antenna 180. The second DUP 540 transmits the RF signal, which is transmitted from the mobile station-side antenna 180, to the third frequency converter 550. The mobile station-side antenna 180 transmits the RF signal, which is transmitted from the second DUP 540, to the mobile station while receiving and transmitting the signal, which is transmitted from the mobile station, to the second DUP 540. (second receiver)

The third frequency converter 550 converts the carrier frequency of the RF signal, which is transmitted from the mobile station-side antenna 180, to baseband frequency (quadrature detection). The third frequency converter 550 includes a third mixer 551 and a UL-side low-pass filter 552. The third mixer 551 multiplies the RF signal, which is transmitted from the mobile station-side antenna 180, and the local signal, which is transmitted from the UL-side local oscillator 520. The third mixer 551 transmits to the UL-side low-pass filter 552 the signal indicative of the result of multiplication.

The UL-side low-pass filter 552 extracts the frequency component of the signal transmitted from the third mixer 551, which is the difference obtained by the multiplication, and transmits the extracted baseband signal to the UL-side delay control unit 560. The signal extracted by the UL-side low-pass filter 552 is a baseband signal, to which the RF signal received by the third frequency converter 550 is converted in frequency.

The UL-side delay control unit 560 is a second delay control unit for controlling the amount of delay of the baseband signal, which is transmitted from the third frequency converter 550, in accordance with delay time rate which is notified by the delay rate calculation unit 151. The UL-side delay control unit 560 transmits the baseband signal, of which amount of delay is controlled, to the UL-side complex multiplier 572. It is noted that the symbol frequency deviation caused by Doppler effect is not varied between the uplink and the downlink.

The UL-side delay control unit 560 controls the amount of delay of the baseband signal based on the delay rate which is notified by the delay rate calculation unit 151, thereby giving to the signal the symbol frequency deviation, which is inverse characteristic of Doppler effect, in transmitting the signal from the relay station 100 to the base transceiver station. Thus, the signal transmitted from the relay station 100 to the base transceiver station is put under a state where frequency deviation caused by Doppler effect is compensated. Since an example of the configuration of the UL-side delay control unit 560 is substantially the same as that of the configuration of the delay control unit 152 of FIG. 3, the description thereof is omitted.

The UL-side compensation oscillator 571 and the UL-side complex multiplier 572 are a second compensation unit which compensates carrier frequency deviation of the baseband signal based on the carrier frequency deviation which is calculated by the UL-side frequency deviation calculation unit 530. The UL-side compensation oscillator 571 oscillates the carrier compensation signal in accordance with the frequency deviation which is notified by the UL-side frequency deviation calculation unit 530.

The UL-side compensation oscillator 571 transmits the oscillated carrier compensation signal to the UL-side complex multiplier 572. The UL-side complex multiplier 572 complex multiplies the baseband signal, which is transmitted from the UL-side delay control unit 560, by the carrier compensation signal, which is transmitted from the UL-side compensation oscillator 571, and transmits the multiplied baseband signal to the fourth frequency converter 580.

The fourth frequency converter 580 converts the baseband frequency of the baseband signal, which is transmitted from the UL-side complex multiplier 572, to the carrier frequency (quadrature modulation). The fourth frequency converter 580 includes a fourth mixer 581 and a UL-side band-pass filter 582. The fourth mixer 581 multiplies the baseband signal, which is transmitted from the UL-side complex multiplier 572, and the local signal, which is transmitted from the UL-side local oscillator 520, and transmits to the UL-side band-pass filter 582 the signal indicative of the result of multiplication.

The UL-side band-pass filter 582 extracts the frequency component of the signal transmitted from the fourth mixer 581, which is the sum obtained by the multiplication. The signal extracted by the UL-side band-pass filter 582 is an RF signal, to which the baseband signal received by the fourth frequency converter 580 is converted in frequency. The UL-side band-pass filter 582 transmits the extracted RF signal to the first DUP 510.

According to the relay station 100 of the second embodiment, in the case of the uplink as well as the downlink, the carrier frequency deviation caused by Doppler effect is compensated and the symbol frequency deviation is compensated by controlling the amount of delay of the signal. Thus, the effect of the relay station 100 of the first embodiment is achieved and the communication quality in the uplink is improved.

The carrier frequency deviation occurring in the signal transmitted to the base transceiver station in the uplink is calculated by using the carrier frequency deviation, which is detected in the downlink, and the ratio of the frequency of the signal of the downlink to the frequency of the signal of the uplink. The carrier frequency deviation occurring in the uplink is compensated by using the calculated carrier frequency deviation in the uplink.

(Third Embodiment)

Figure 6:
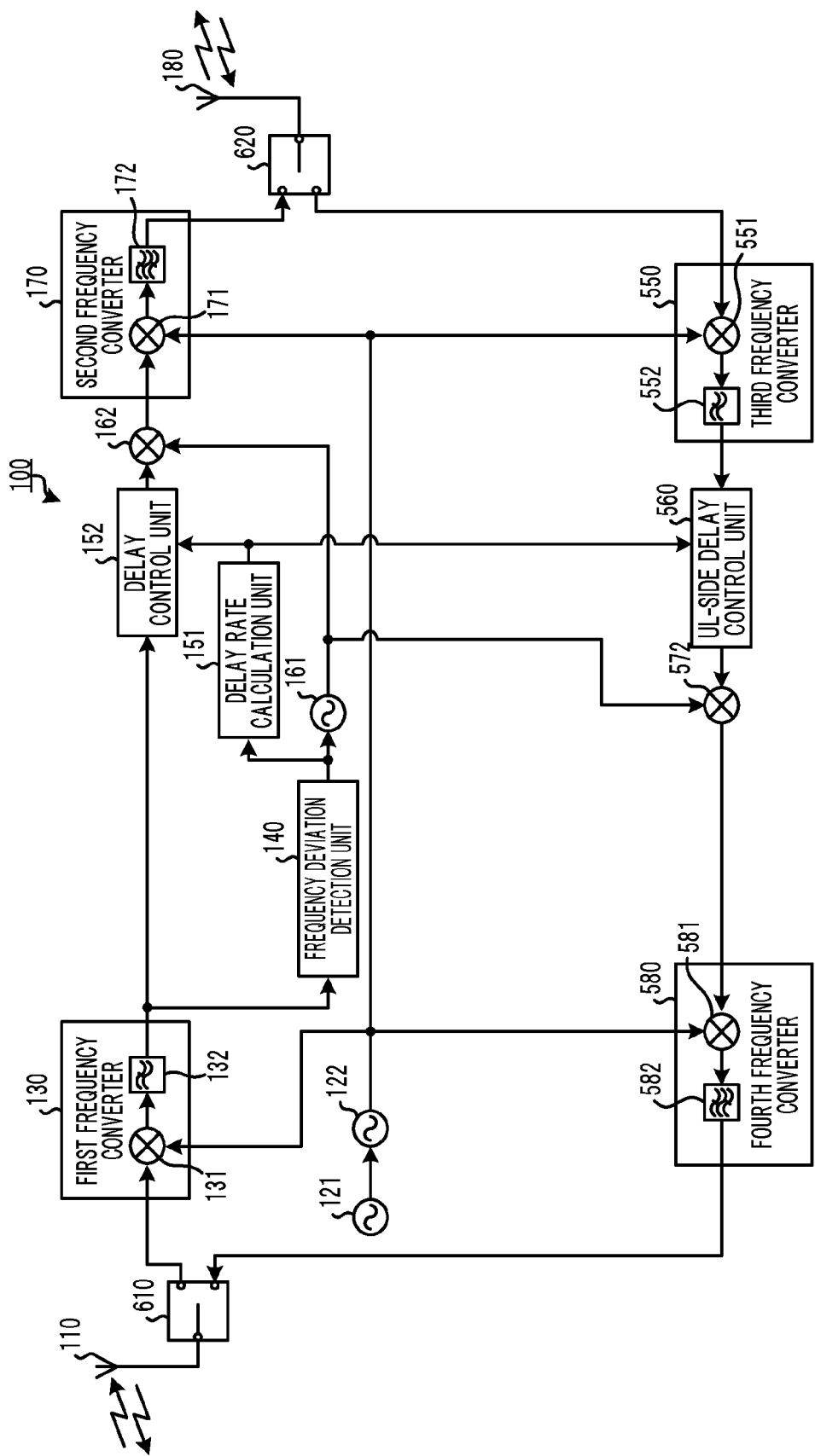
FIG. 6 is a block diagram illustrating the configuration of a relay station according to a third embodiment.

FIG. 6 is a block diagram illustrating the configuration of the relay station according to the third embodiment. Referring to FIG. 6, like reference numerals of FIG. 5 are applied to like elements and the description thereof is omitted. The relay station 100 of the third embodiment performs two-way communication caused by Time Domain Duplex (TDD).

The relay station 100 includes a first switch 610 instead of the first DUP 510 of FIG. 5. The relay station 100 also includes a second switch 620 instead of the second DUP 540 of FIG. 5. In the third embodiment, the UL-side local oscillator 520, the UL-side frequency deviation calculation unit 530 and the UL-side compensation oscillator 571 which are illustrated in FIG. 5 may be eliminated from the relay station 100.

In the TDD, the signal of downlink (DL), which the relay station 100 receives from the base transceiver station, and the signal of uplink (UL), which the relay station 100 receives from the mobile station, may be equalized in carrier frequency. In this case, since the downlink and the uplink are equalized in carrier frequency deviation, the carrier frequency deviation detected in the downlink may also be used as a carrier frequency deviation in the uplink.

The base transceiver station-side antenna 110 receives the RF signal transmitted from the base transceiver station and transmits the received RF signal to the first switch 610. The base transceiver station-side antenna 110 transmits the RF signal transmitted from the first switch 610 to the base transceiver station. The first switch 610 switches to either a DL path state or a UL path state by the control of a control unit (not illustrated). The first switch 610 in the DL path state transmits the RF signal transmitted from the base transceiver station-side antenna 110 to the first frequency converter 130. The first switch 610 in the UL path state transmits the RF signal transmitted from the fourth frequency converter 580 to the base transceiver station-side antenna 110.

The reference oscillator 121 transmits the oscillated reference signal to the local oscillator 122. The local oscillator 122 transmits the oscillated local signal to each of the first frequency converter 130, the second frequency converter 170, the third frequency converter 550 and the fourth frequency converter 580. The frequency deviation detection unit 140 notifies of the detected frequency deviation each of the delay rate calculation unit 151 and the compensation oscillator 161.

The compensation oscillator 161 transmits the oscillated carrier compensation signal to each of the complex multiplier 162 and the UL-side complex multiplier 572. The UL-side complex multiplier 572 complex multiplies the baseband signal, which is transmitted from the UL-side delay control unit 560, by the carrier compensation signal, which is transmitted from the compensation oscillator 161.

According to the relay station 100 of the third embodiment, in the case of the uplink as well as the downlink, the carrier frequency deviation caused by Doppler effect is compensated and the symbol frequency deviation is compensated by controlling the amount of delay of the signal. Thus, the effect of the relay station 100 of the first embodiment is achieved and the communication quality in the uplink is improved.

The downlink and the uplink are equalized in carrier frequency deviation, so that the carrier frequency deviation occurring in the uplink may be compensated by using the carrier frequency deviation detected in the downlink.

(Fourth Embodiment)

Figure 7:
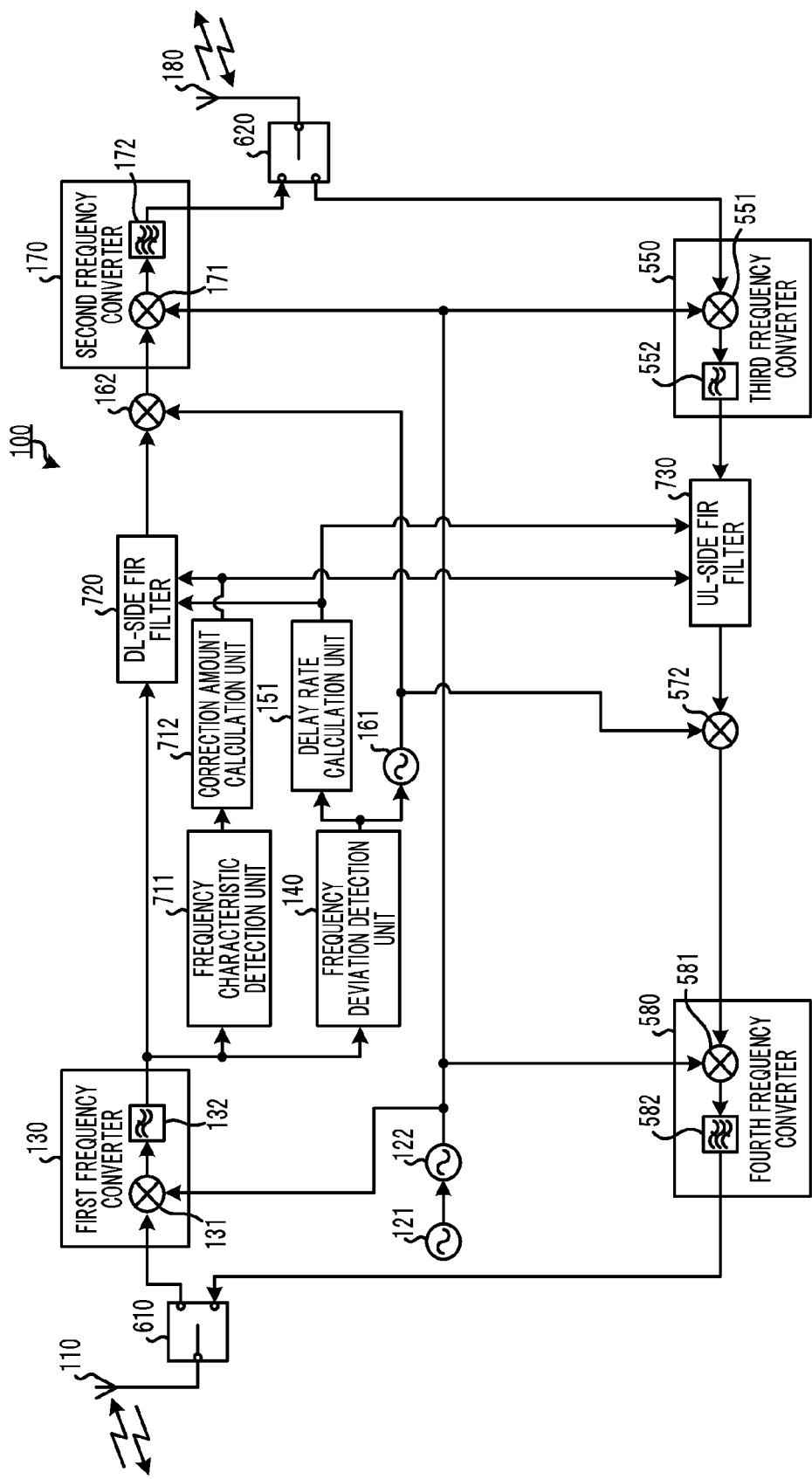
FIG. 7 is a block diagram illustrating the configuration of a relay station according to a fourth embodiment.

FIG. 7 is a block diagram illustrating the configuration of the relay station according to the fourth embodiment. Referring to FIG. 7, like reference numerals of FIG. 6 are applied to like elements and the description thereof is omitted. The relay station 100 of the fourth embodiment performs two-way communication caused by TDD while compensating the frequency characteristic between the base transceiver station and the relay station 100.

The relay station 100 includes a frequency characteristic detection unit 711 and a correction amount calculation unit 712 in addition to the configuration of FIG. 6. The relay station 100 includes a DL-side FIR filter 720 instead of the delay control unit 152 of FIG. 6. The relay station 100 also includes a UL-side FIR filter 730 instead of the UL-side delay control unit 560 of FIG. 6.

The first frequency converter 130 transmits the baseband signal, of which frequency is converted, to each of the frequency deviation detection unit 140, the frequency characteristic detection unit 711 and the DL-side FIR filter 720. The frequency characteristic detection unit 711 detects the frequency characteristic of usable frequency range for the baseband signal, which is transmitted from the first frequency converter 130. The frequency characteristic detection unit 711 notifies the correction amount calculation unit 712 of the detected frequency characteristic.

The correction amount calculation unit 712 calculates frequency characteristic correction amount based on the frequency characteristic, which is notified by the frequency characteristic detection unit 711, and transmits the calculated frequency characteristic correction amount to each of the DL-side FIR filter 720 and the UL-side FIR filter 730. The delay rate calculation unit 151 transmits the calculated delay rate to each of the DL-side FIR filter 720 and the UL-side FIR filter 730.

The DL-side FIR filter 720 includes a function to equalize the frequency characteristic of the baseband signal, which is transmitted from the first frequency converter 130, together with the function of the delay control unit 152 of FIG. 6. The DL-side FIR filter 720 controls the amount of delay of the baseband signal in accordance with the delay time rate dτ/dt, which is notified by the delay rate calculation unit 151.

The DL-side FIR filter 720 controls the frequency characteristic of the baseband signal in accordance with the frequency characteristic correction amount, which is notified by the correction amount calculation unit 712. The DL-side FIR filter 720 transmits the baseband signal, of which amount of delay and frequency characteristic are controlled, to the complex multiplier 162. The complex multiplier 162 complex multiplies the baseband signal, which is transmitted from the DL-side FIR filter 720, by the carrier compensation signal, which is transmitted from the compensation oscillator 161.

The UL-side FIR filter 730 includes a function to equalize the frequency characteristic of the baseband signal (second equalizing unit), which is transmitted from the third frequency converter 550, together with the function of the UL-side delay control unit 560 of FIG. 6. The UL-side FIR filter 730 controls the amount of delay of the baseband signal, which is transmitted from the third frequency converter 550, in accordance with the delay time rate dτ/dt, which is notified by the delay rate calculation unit 151.

The UL-side FIR filter 730 controls the frequency characteristic of the baseband signal in accordance with the frequency characteristic correction amount, which is notified by the correction amount calculation unit 712. The UL-side FIR filter 730 transmits the baseband signal, of which amount of delay and frequency characteristic are controlled, to the UL-side complex multiplier 572. The UL-side complex multiplier 572 complex multiplies the baseband signal, which is transmitted from the UL-side FIR filter 730, by the carrier compensation signal, which is transmitted from the compensation oscillator 161.

In the TDD, the signal of downlink (DL), which the relay station 100 receives from the base transceiver station, and the signal of uplink (UL), which the relay station 100 receives from the mobile station, may be equalized in carrier frequency. In this case, since the downlink and the uplink are equalized in carrier frequency deviation, the frequency characteristic correction amount calculated in the downlink may also be used as a frequency characteristic correction amount in the uplink.

Figure 8:
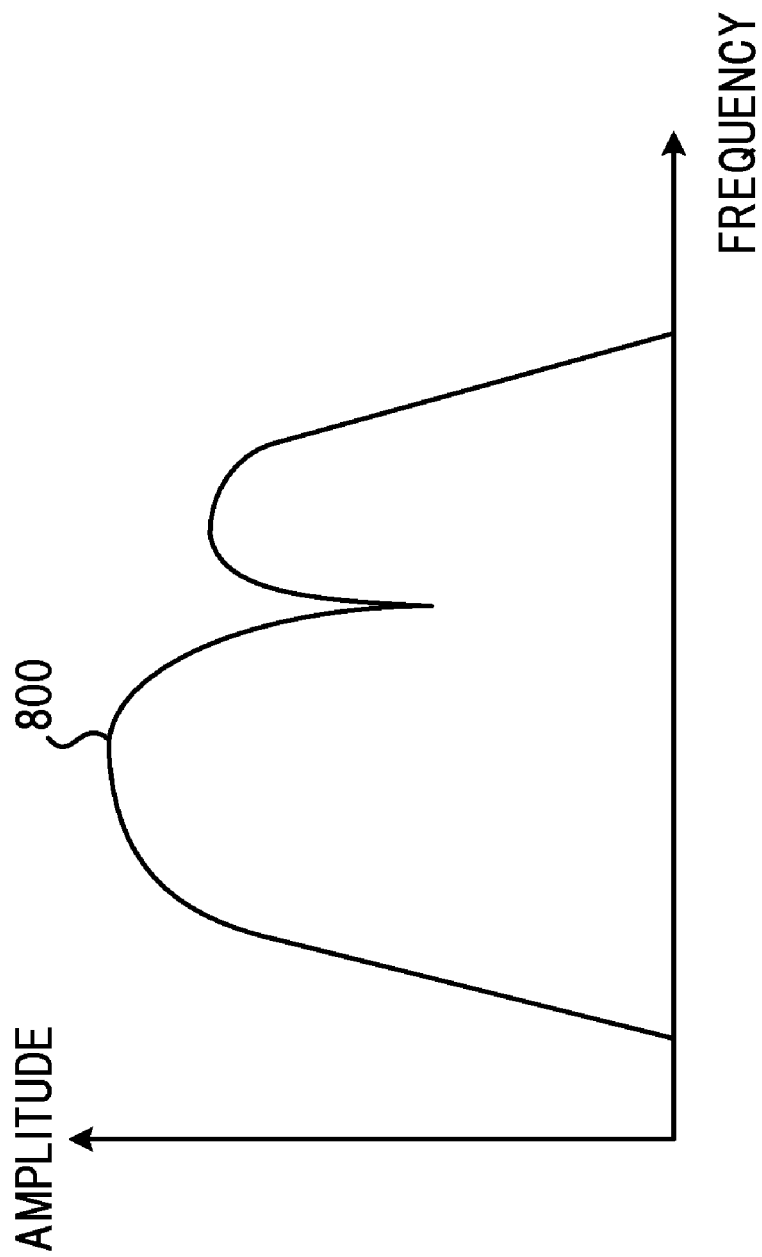
FIG. 8 is a graph illustrating the frequency characteristic of the signal received by a relay station.

FIG. 8 is a graph illustrating the frequency characteristic of the signal received by the relay station. Referring to FIG. 8, the horizontal axis represents frequency and the vertical axis represents amplitude. The frequency characteristic 800 of FIG. 8 represents the frequency characteristic of the signal which the relay station 100 receives from the base transceiver station. As illustrated by the frequency characteristic 800, there normally exists frequency characteristic, in which amplitude varies depending on the frequency due to the multipath and so forth, in the signal which the relay station 100 receives from the base transceiver station.

Figure 9:
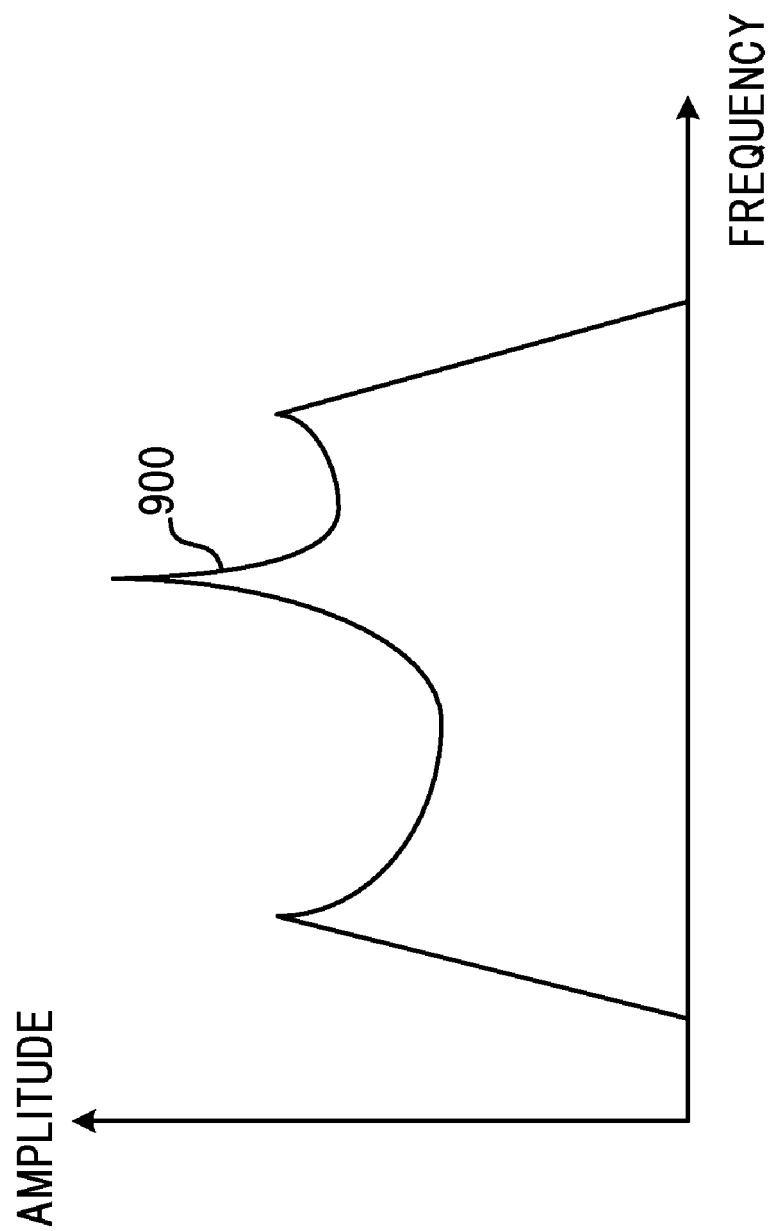
FIG. 9 is a graph illustrating the frequency characteristic of a FIR filter.

FIG. 9 is a graph illustrating the frequency characteristic of the FIR filter. Referring to FIG. 9, the horizontal axis represents frequency and the vertical axis represents amplitude. The frequency characteristic 900 of FIG. 9 is frequency characteristic of the DL-side FIR filter 720 illustrated in FIG. 7. The DL-side FIR filter 720 has frequency characteristic which is inverse characteristic of the frequency characteristic 800 of the received signal illustrated in FIG. 8.

Figure 10:
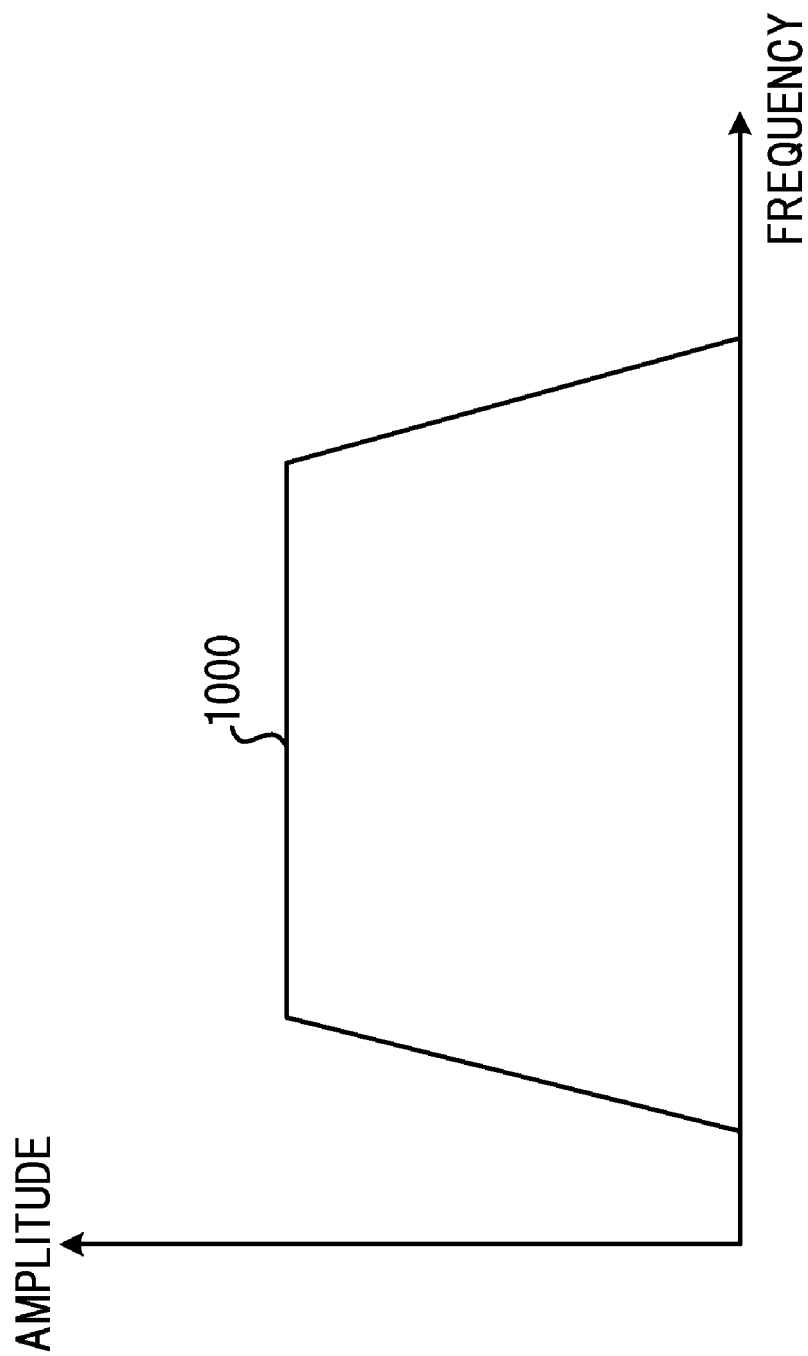
FIG. 10 is a graph illustrating the frequency characteristic of the output signal of the FIR filter.

FIG. 10 is a graph illustrating the frequency characteristic of the output signal of the FIR filter. Referring to FIG. 10, the horizontal axis represents frequency and the vertical axis represents amplitude. The frequency characteristic 1000 of FIG. 10 is frequency characteristic of the output signal of the DL-side FIR filter 720 illustrated in FIG. 7. As illustrated in FIGS. 8 and 9, the frequency characteristic 900 (refer to FIG. 9) of the DL-side FIR filter 720 is inverse characteristic of the frequency characteristic 800 (refer to FIG. 8) of the received signal.

Therefore, the frequency characteristic 1000 of the output signal of the DL-side FIR filter 720 represents specified amplitude to the frequency. Since the DL-side FIR filter 720 has frequency characteristic 900 which is inverse characteristic of the frequency characteristic 800 of the received signal, the frequency characteristic 800 of the received signal are made flat.

Although the DL-side FIR filter 720 is illustrated in FIGS. 8 to 10, the UL-side FIR filter 730 is illustrated in a similar manner. The UL-side FIR filter 730 has frequency characteristic which is inverse characteristic of the frequency characteristic of the signal transmitted from the relay station 100 to the base transceiver station, so that the frequency characteristic of the signal transmitted to the base transceiver station is equalized.

Figure 11:
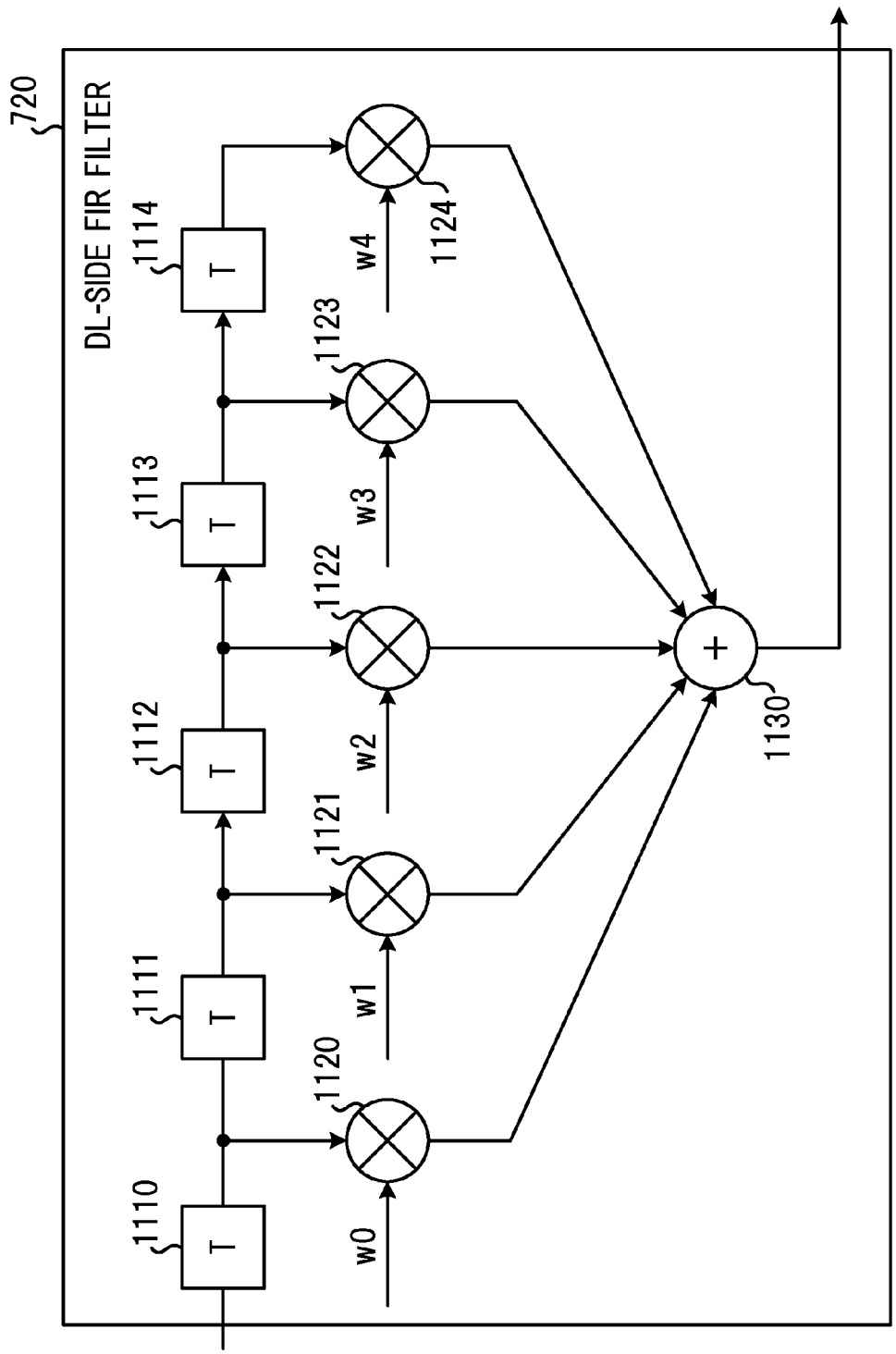
FIG. 11 is a block diagram illustrating an example of the configuration of each FIR filter of FIG. 7.

FIG. 11 is a block diagram illustrating an example of the configuration of each FIR filter of FIG. 7. Although the DL-side FIR filter 720 is illustrated in FIG. 11, the UL-side FIR filter 730 is illustrated in a similar manner. As illustrated in FIG. 11, the DL-side FIR filter 720 is a transversal filter which includes delay circuits 1110 to 1114, multipliers 1120 to 1124, an adder 1130 and a tap coefficient control circuit (not illustrated).

The tap coefficient control circuit (not illustrated) of the DL-side FIR filter 720 transmits tap coefficients w0 to w4 to the multipliers 1120 to 1124, respectively. The baseband signal which is transmitted to the DL-side FIR filter 720 is received by the delay circuit 1110. The delay circuit 1110 delays the received baseband signal and transmits the delayed baseband signal to each of the multiplier 1120 and the delay circuit 1111. The multiplier 1120 multiplies the received baseband signal by the tap coefficient w0 and transmits the multiplied baseband signal to the adder 1130.

The delay circuit 1111 delays the baseband signal, which is transmitted from the delay circuit 1110, and transmits the delayed baseband signal to each of the multiplier 1121 and the delay circuit 1112. The multiplier 1121 multiplies the baseband signal, which is transmitted from the delay circuit 1111, by the tap coefficient w1 and transmits the multiplied baseband signal to the adder 1130.

The delay circuit 1112 delays the baseband signal, which is transmitted from the delay circuit 1111, and transmits the delayed baseband signal to each of the multiplier 1122 and the delay circuit 1113. The multiplier 1122 multiplies the baseband signal, which is transmitted from the delay circuit 1112, by the tap coefficient w2 and transmits the multiplied baseband signal to the adder 1130.

The delay circuit 1113 delays the baseband signal, which is transmitted from the delay circuit 1112, and transmits the delayed baseband signal to each of the multiplier 1123 and the delay circuit 1114. The multiplier 1123 multiplies the baseband signal, which is transmitted from the delay circuit 1113, by the tap coefficient w3 and transmits the multiplied baseband signal to the adder 1130.

The delay circuit 1114 delays the baseband signal, which is transmitted from the delay circuit 1113, and transmits the delayed baseband signal to the multiplier 1124. The multiplier 1124 multiplies the baseband signal, which is transmitted from the delay circuit 1114, by the tap coefficient w4 and transmits the multiplied baseband signal to the adder 1130.

The adder 1130 adds the baseband signals together, which are transmitted from the multipliers 1120 to 1124, and transmits the added baseband signal to the complex multiplier 162. The tap coefficient control circuit (not illustrated) of the DL-side FIR filter 720 adjusts the tap coefficients w0 to w4, which are received by the multipliers 1120 to 1124, based on the delay rate, which is notified by the delay rate calculation unit 151, and the frequency characteristic correction amount, which is notified by the correction amount calculation unit 712. Thus, the amount of delay and the frequency characteristic of the baseband signal may be varied.

Figure 12:
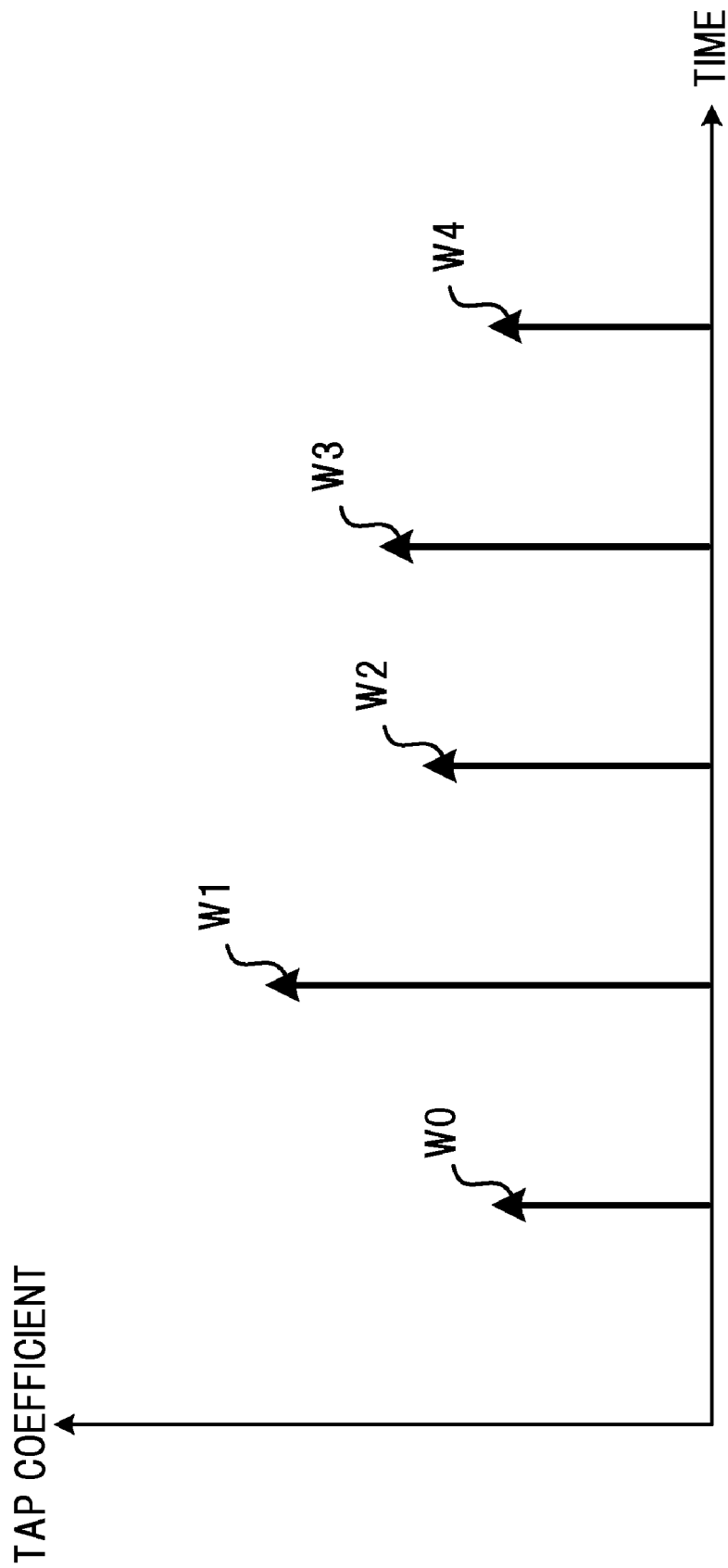
FIG. 12 is a diagram illustrating an example of the operation of the frequency characteristic correction of the FIR filter of FIG. 7.

FIG. 12 is a diagram illustrating an example of the operation of the frequency characteristic correction of the FIR filter of FIG. 7. The tap coefficients w0 to w4 of FIG. 12 are the tap coefficients w0 to w4 which are received by the multipliers 1120 to 1124 of FIG. 11. For example, the tap coefficient control circuit of the DL-side FIR filter 720 may achieve the frequency characteristic 900 of the DL-side FIR filter 720 of FIG. 9 by adjusting the tap coefficients w0 to w4 as illustrated in FIG. 12.

According to the relay station 100 of the fourth embodiment, the effect of the relay station 100 of the first embodiment is achieved and the communication quality is further improved by equalizing the frequency characteristic of the baseband signal. The delay amount control unit, which controls the delay amount of the signal, and the equalizing unit, which equalizes the frequency characteristic of the signal, are simultaneously achieved by the transversal filter which determines the tap coefficient based on the delay rate and the frequency characteristic. Therefore, the station is reduced in cost and size. Although the configuration of the relay station 100 of the third embodiment is used in the fourth embodiment, the configuration of the relay station 100 of the second embodiment may be used.

(Fifth Embodiment)

Figure 13:
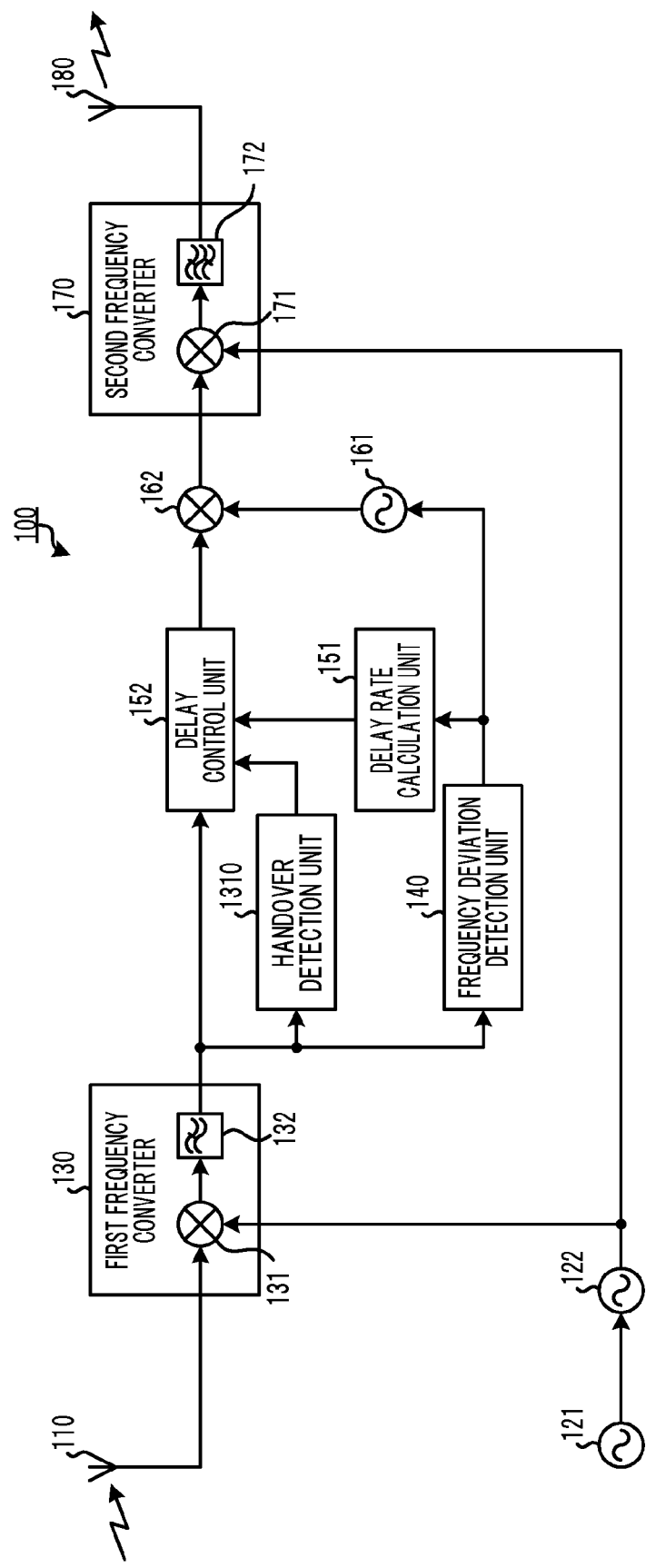
FIG. 13 is a block diagram illustrating the configuration of the relay station according to a fifth embodiment.

FIG. 13 is a block diagram illustrating the configuration of the relay station according to the fifth embodiment. Referring to FIG. 13, like reference numerals of FIG. 1 are applied to like elements and the description thereof is omitted. When the relay station 100 of the fifth embodiment detects handover, it initializes the amount of delay of the baseband signal. The relay station 100 includes a handover detection unit 1310 in addition to the configuration of FIG. 1. The first frequency converter 130 transmits the baseband signal, of which frequency is converted, to each of the frequency deviation detection unit 140, the delay control unit 152 and the handover detection unit 1310.

The handover detection unit 1310 monitors the baseband signal, which is transmitted from the first frequency converter 130, thereby detecting the switching (or handover) of the base transceiver station which the relay station 100 communicates with. When the handover detection unit 1310 detects the handover, it notifies the delay control unit 152 of the detection of the handover.

When the delay control unit 152 is notified of the detection of the handover by the handover detection unit 1310, it sets the amount of delay of the baseband signal at an initial value. The set value of the amount of delay is an optimum amount of delay for the case where Doppler effect does not occur, and is normally zero. Thus, delaying the baseband signal by the amount of delay controlled in accordance with Doppler effect that occurred between the relay station 100 and the base transceiver station, which the relay station 100 communicated with, before the handover is conducted is prevented.

According to the relay station 100 of the fifth embodiment, the effect of the relay station 100 of the first embodiment is achieved. In addition, when the relay station 100 detects the handover, the relay station 100 initializes the amount of delay of the baseband signal. Thus, the deterioration of the communication quality for the case where the occurrence of Doppler effect is varied by the handover is reduced. Although the configuration of the relay station 100 of the first embodiment is used in the fifth embodiment, the configuration of each relay station 100 of the second to fourth embodiments may be used.

(Sixth Embodiment)

Figure 14:
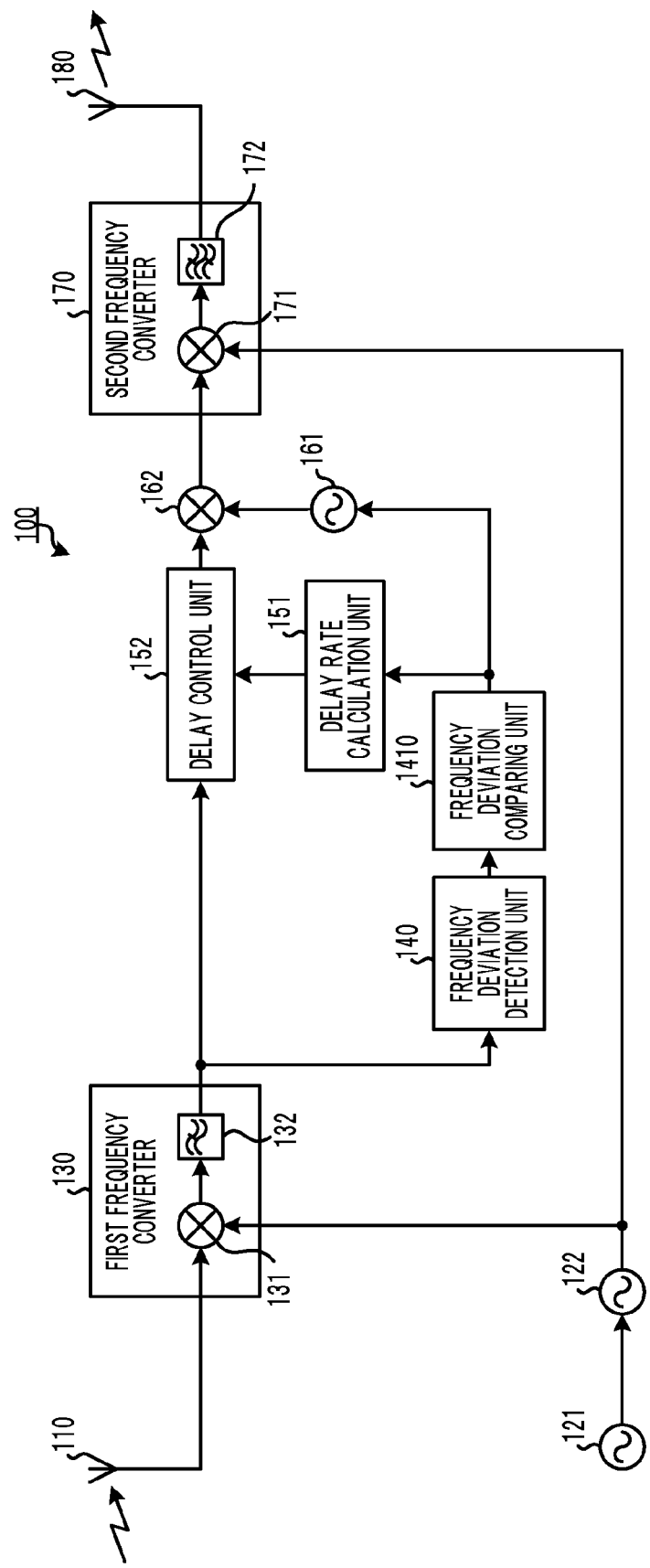
FIG. 14 is a block diagram illustrating the configuration of the relay station according to a sixth embodiment.

FIG. 14 is a block diagram illustrating the configuration of the relay station according to the sixth embodiment. Referring to FIG. 14, like reference numerals of FIG. 1 are applied to like elements and the description thereof is omitted. The relay station 100 of the sixth embodiment stops controlling the amount of delay of the delay control unit 152 when the carrier frequency deviation is less than or equal to a threshold value.

The relay station 100 includes a frequency deviation comparing unit 1410 in addition to the configuration of FIG. 1. The frequency deviation detection unit 140 notifies the frequency deviation comparing unit 1410 of the detected frequency deviation. The frequency deviation comparing unit 1410 compares the frequency deviation, which is notified by the frequency deviation detection unit 140, with the specified threshold value. The specified threshold value is frequency deviation such that, for example, Doppler effect hardly occurs and if it is disregarded, it less affects the communication quality.

When the frequency deviation is larger than the threshold value, the frequency deviation comparing unit 1410 notifies of the frequency deviation, which is notified by the frequency deviation detection unit 140, each of the delay rate calculation unit 151 and the compensation oscillator 161. When the frequency deviation is less than or equal to the threshold value, on the other hand, the frequency deviation comparing unit 1410 notifies of the frequency deviation, which is zero, each of the delay rate calculation unit 151 and the compensation oscillator 161.

Thus, when Doppler effect hardly occurs, control of the amount of delay of the baseband signal due to the delay control unit 152 and control of the carrier frequency due to the complex multiplier 162 are stopped. Therefore, when the moving object is stopped or moves at a low speed, occurrence of overflow or underflow in the delay control unit 152, which is caused by the carrier frequency deviation between the base transceiver station and the relay station 100, is prevented.

The relay station 100 of the sixth embodiment achieves substantially the same effect as that of the first embodiment. In addition, when the carrier frequency deviation is less than or equal to the threshold value, the relay station 100 of the sixth embodiment stops controlling the amount of delay of the delay control unit 152. Thus, when the moving object is stopped or moves at a low speed, occurrence of overflow or underflow in the delay control unit 152 is prevented, which stably achieves control of the amount of delay. Although the configuration of the relay station 100 of the first embodiment is used in the sixth embodiment, the configuration of each relay station 100 of the second to fifth embodiments may be used.

(Seventh Embodiment)

Figure 15:
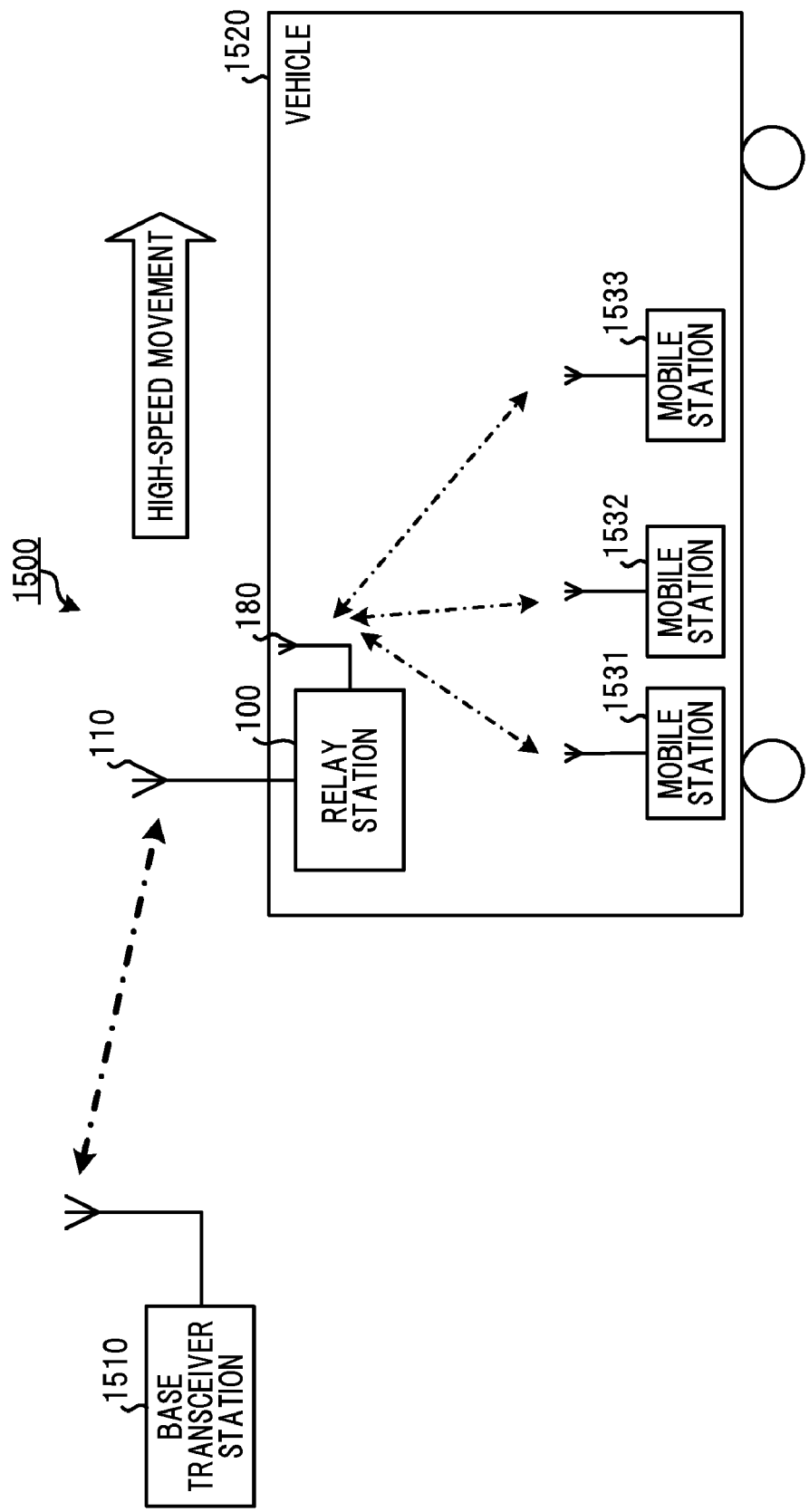
FIG. 15 is a block diagram illustrating the configuration of the communication station according to a seventh embodiment.

FIG. 15 is a block diagram illustrating the configuration of the communication system according to the seventh embodiment. Referring to FIG. 15, like reference numerals of FIG. 1 are applied to like elements and the description thereof is omitted. As illustrated in FIG. 15, the communication system 1500 of the seventh embodiment includes a base transceiver station 1510, the relay station 100 and mobile stations 1531 to 1533. The base transceiver station 1510 is set at a fixed position and communicates with the mobile stations 1531 to 1533 via relay of the relay station 100. The relay station 100 is set in a vehicle 1520 such as a train.

Each of the mobile stations 1531 to 1533 is a terminal device located in the vehicle 1520. For example, each of the mobile stations 1531 to 1533 is a terminal device such as a mobile telephone which a user on the vehicle 1520 has. Since the vehicle 1520 varies the distance from the base transceiver station 1510 by high-speed movement, Doppler effect occurs in communication between the base transceiver station 1510 and the relay station 100.

According to the communication system 1500 of the seventh embodiment, the carrier frequency deviation and the symbol frequency deviation caused by Doppler effect occurring in communication between the base transceiver station 1510 and the relay station 100 may be compensated by the relay station 100. Thus, high quality of the communication between the base transceiver station 1510 and the mobile stations 1531 to 1533 via relay of the relay station 100 may be achieved.

A communication station may be set at a specific position in the vehicle 1520 instead of the mobile stations 1531 to 1533. In this case, when the communication between the communication station in the vehicle 1520 and the base transceiver station 1510 is relayed by the relay station 100, high-quality communication may be achieved. A communication station may be set in a moving object other than the vehicle 1520 instead of the base transceiver station 1510. In this case, when the communication between the communication station set in the moving object other than the vehicle 1520 and the mobile stations 1531 to 1533 is relayed by the relay station 100, high-quality communication may be achieved.

Although the relay station 100 of the first embodiment is applied to the communication system 1500, each relay station 100 of the second to sixth embodiments may be applied to the communication system 1500.

(Eighth Embodiment)

Figure 16:
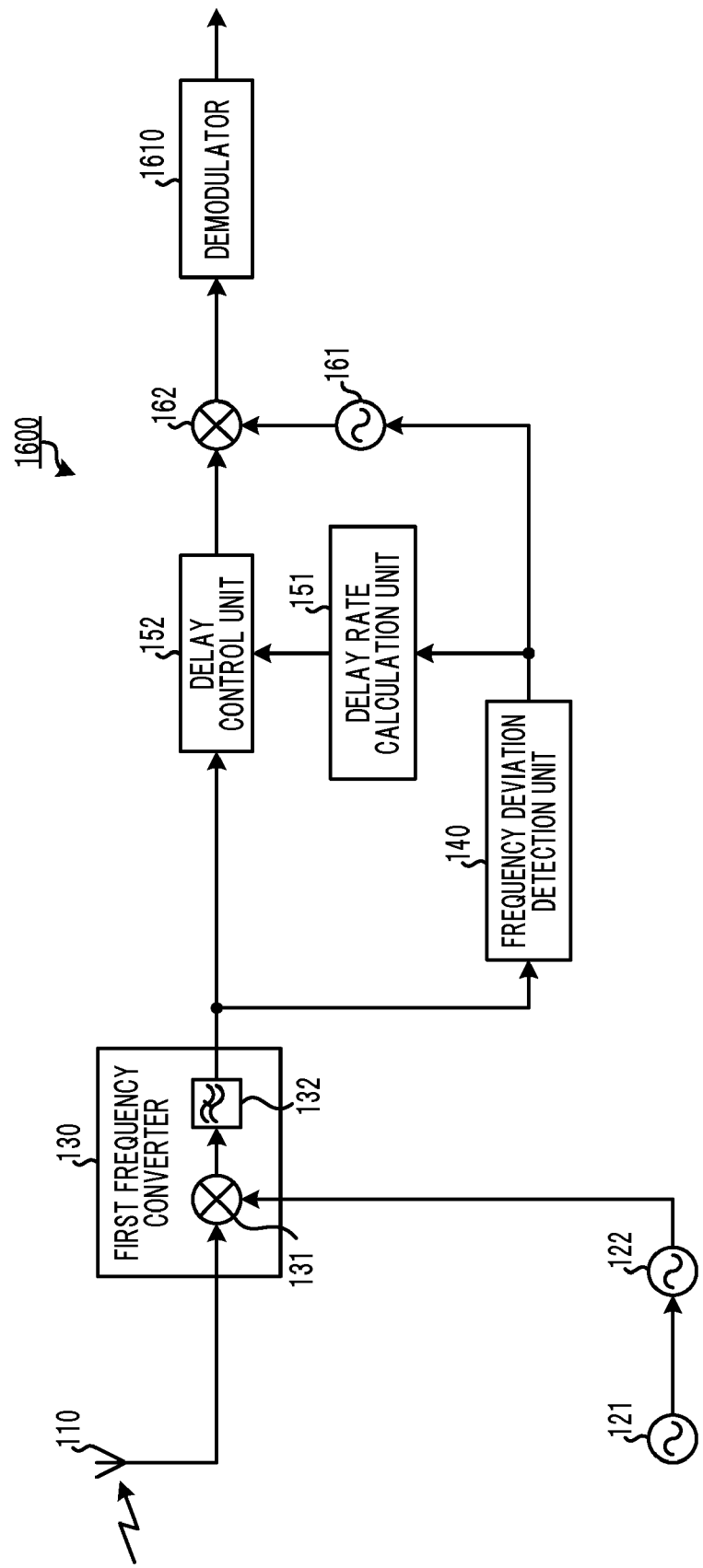
FIG. 16 is a block diagram illustrating the configuration of the receiving station according to an eighth embodiment.

FIG. 16 is a block diagram illustrating the configuration of the receiving station according to the eighth embodiment. Referring to FIG. 16, like reference numerals of FIG. 1 are applied to like elements and the description thereof is omitted. Although the relay station 100 is described in the first to seventh embodiments, the present invention is applicable to the receiving station. The receiving station according to the eighth embodiment is a radio receiving station which is provided in a moving object such as a train for performing communication between the receiving station and a base transceiver station outside of the moving object.

As illustrated in FIG. 16, the receiving station 1600 of the eighth embodiment includes a base transceiver station-side antenna 110, a reference oscillator 121, a local oscillator 122, a first frequency converter 130, a frequency deviation detection unit 140, a delay rate calculation unit 151, a delay control unit 152, a compensation oscillator 161, a complex multiplier 162 and a demodulator 1610.

The complex multiplier 162 transmits the baseband signal, which is complex multiplied, to the demodulator 1610. The demodulator 1610 demodulates the baseband signal, which is transmitted from the complex multiplier 162. The demodulator 1610 transmits the data, which is obtained by the demodulation, to the subsequent part. Thus, the receiving station 1600 may receive the signal transmitted from the base transceiver station.

The receiving station 1600 is applicable to the communication station, which is set at the specified position in the vehicle 1520 of FIG. 15, for example. The receiving station 1600 is also applicable to the mobile stations 1531 to 1533 set in the vehicle 1520 of FIG. 15. Although not illustrated, the function to transmit the signal to the base transceiver station may be provided in the receiving station 1600 to form a communication station which transmits and receives the signal between the receiving station 1600 and the base transceiver station.

Although the receiving station 1600 is provided in the moving object such as a train for communicating with the base transceiver station outside of the moving object, the receiving station 1600 is also applicable to the base transceiver station which is set at a fixed position outside of the moving object. In this case, the receiving station 1600 receives the signal which is transmitted from the communication station at the specified position in the moving object or the mobile station.

According to the receiving station 1600 of the eighth embodiment, the effect of the relay station 100 of the first embodiment is substantially achieved. Although the configuration of the relay station 100 of the first embodiment is applied to the receiving station 1600 in the eighth embodiment, the configuration of each relay station 100 of the second to sixth embodiments may be applied to the receiving station 1600.

As described above, according to the relay station, the relay method, the receiving station and the receiving method, the carrier frequency deviation caused by Doppler effect is compensated and the symbol frequency deviation is compensated by controlling the amount of delay of the signal. Thus, communication quality is improved. In addition, the carrier frequency and the symbol frequency may be synchronized by compensating both the carrier frequency deviation and the symbol frequency deviation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay station comprising:
  a receiver that receives a signal from a base transceiver station;
  a detection unit that detects a carrier frequency deviation of the received signal;
  a calculation unit that calculates a delay rate of the signal based on the detected carrier frequency deviation;

a delay control unit that controls an amount of delay of the signal in accordance with the calculated delay rate;
a compensation unit that compensates for the detected carrier frequency deviation of the signal; and
a transmitter that transmits the signal of which the amount of delay is controlled and of which the carrier frequency deviation is compensated for.

2. The relay station according to claim 1, wherein the detection unit detects the carrier frequency deviation based on a pilot signal included in the signal.

3. The relay station according to claim 1, further comprising:
a second receiver that receives a second signal that is different from the signal in frequency;
a second delay control unit that controls an amount of delay of the second signal in accordance with the calculated delay rate;
a second calculation unit that calculates a second carrier frequency deviation, which occurs in the second signal transmitted to the base transceiver station, based on the detected carrier frequency deviation;
a second compensation unit that compensates for the second carrier frequency deviation of the second signal calculated by the second calculation unit; and
a second transmitter that transmits to the base transceiver station the second signal of which the amount of delay is controlled and of which the second carrier frequency deviation is compensated for.

4. The relay station according to claim 3, wherein the second calculation unit calculates the second carrier frequency deviation based on a ratio of a frequency of the signal to a frequency of the second signal.

5. The relay station according to claim 1, further comprising:
a second receiver that receives a second signal that has a same frequency as the signal;
a second delay control unit that controls an amount of delay of the second signal in accordance with the calculated delay rate;
a second compensation unit that compensates the second signal for the detected carrier frequency deviation; and
a second transmitter that transmits to the base transceiver station the second signal of which the amount of delay is controlled and of which the carrier frequency deviation is compensated for.

6. The relay station according to claim 5, further comprising:
a characteristic detection unit that detects a frequency characteristic of the signal from the base transceiver station; and
an equalizing unit that equalizes the signal based on the detected frequency characteristic, wherein
the delay control unit and the equalizing unit are a transversal filter which determines tap coefficients based on the delay rate and the frequency characteristic.

7. The relay station according to claim 6, further comprising a second equalizing unit that equalizes the second signal based on the detected frequency characteristic, wherein
the second delay control unit and the second equalizing unit are a second transversal filter which determines tap coefficients based on the delay rate and the frequency characteristic.

8. The relay station according to claim 1, further comprising a handover detection unit that detects a handover based on the received signal, wherein
the delay control unit initializes the amount of delay when the handover is detected.

9. The relay station according to claim 1, further comprising a comparing unit that compares a specified threshold value with the detected carrier frequency deviation, wherein
the delay control unit stops controlling the amount of delay when the detected carrier frequency deviation is less than or equal to the threshold value as a result of the comparison of the comparing unit.

10. A relay station comprising:
a receiver that receives a radio signal from a base transceiver station;
a first frequency converter that converts a frequency of the received radio signal to a baseband frequency;
a detection unit that detects a carrier frequency deviation of the baseband frequency signal;
a calculation unit that calculates a delay rate of the baseband frequency signal based on the detected carrier frequency deviation;
a delay control unit that controls an amount of delay of the baseband frequency signal in accordance with the calculated delay rate;
a compensation unit that compensates for the detected carrier frequency deviation of the baseband frequency signal;
a second frequency converter that converts the baseband frequency of the baseband frequency signal, of which the amount of delay is controlled and of which the carrier frequency deviation is compensated for, to a radio frequency; and
a transmitter that transmits the radio frequency signal.

11. A relay station comprising:
a receiver that receives a radio signal from a base transceiver station;
a first frequency converter that converts a frequency of the received radio signal to an intermediate frequency;
a detection unit that detects a carrier frequency deviation of the intermediate frequency signal;
a calculation unit that calculates a delay rate of the intermediate frequency signal based on the detected carrier frequency deviation;
a delay control unit that controls an amount of delay of the intermediate frequency signal in accordance with the calculated delay rate;
a compensation unit that compensates for the detected carrier frequency deviation of the intermediate frequency signal;
a second frequency converter that converts the intermediate frequency of the intermediate frequency signal, of which the amount of delay is controlled and of which the carrier frequency deviation is compensated for, to a radio frequency; and
a transmitter that transmits the radio frequency signal.

12. A relay method comprising:
receiving a signal from a base transceiver station;
detecting a carrier frequency deviation of the received signal;
calculating a delay rate of the signal based on the detected carrier frequency deviation;
controlling an amount of delay of the signal in accordance with the calculated delay rate;
compensating for the detected carrier frequency deviation of the signal; and
transmitting the signal of which the amount of delay is controlled and of which the carrier frequency deviation is compensated for.

* * * * *